Figure 1:
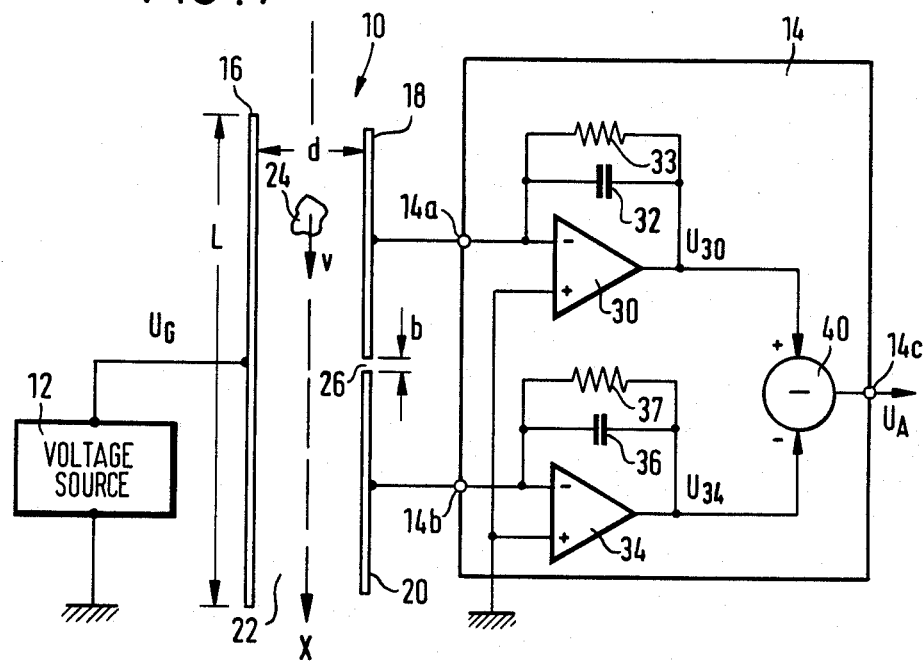

United States Patent [19]

Schneider

[11] Patent Number: 4,752,727
[45] Date of Patent: Jun. 21, 1988

[54] ARRANGEMENT FOR DETECTING SPATIAL INHOMOGENEITIES IN A DIELECTRIC

[75] Inventor: Georg Schneider, Stutensee-Spöck, Fed. Rep. of Germany

[73] Assignee: Endress u. Hauser GmbH u. Co., Fed. Rep. of Germany

[21] Appl. No.: 765,726

[22] Filed: Aug. 15, 1985

[30] Foreign Application Priority Data

Sep. 10, 1984 [DE] Fed. Rep. of Germany ....... 3433148

[51] Int. Cl.$^4$ .............................................. G01P 5/00
[52] U.S. Cl. ................................. 324/61 P; 324/178; 324/71.4; 340/870.37
[58] Field of Search ................. 340/870.37; 324/61 R, 324/61 P, 178, 71.4, 160, 77 G

[56] References Cited

U.S. PATENT DOCUMENTS

| | | | |
|---|---|---|---|
| 3,729,728 | 4/1973 | Hardway | 340/870.37 |
| 3,732,553 | 5/1973 | Hardway | 340/870.37 |
| 3,860,918 | 1/1975 | Cencel | 340/870.37 |

FOREIGN PATENT DOCUMENTS

| | | |
|---|---|---|
| 2544825 | 4/1977 | Fed. Rep. of Germany . |
| 2544822 | 4/1977 | Fed. Rep. of Germany . |
| 3235750 | 3/1984 | Fed. Rep. of Germany . |

OTHER PUBLICATIONS

Hardway; "Position Sensor..." Electronics—Aug. 16, 1971, pp. 86–88—USCl 340-870.37.

Primary Examiner—Reinhard J. Eisenzopf
Assistant Examiner—Jose M. Solis
Attorney, Agent, or Firm—Barnes & Thornburg

[57] ABSTRACT

The arrangement includes a capacitive probe comprising pairs of sensor electrodes, arranged in a pseudo-random sequence, with which a common transmitting electrode is associated. The transmitting electrode is fed by an electrical voltage source and to the sensor electrodes of each pair an electrode circuit is connected which generates an output signal which corresponds to the difference of the displacement currents induced in the sensor electrodes. The electronic circuit is constructed such that it maintains the sensor electrodes at any time at a virtual ground potential. For this purpose each sensor electrode may be connected to the inverting input of an operational amplifier whose non-inverting input lies at the potential at which the sensor electrodes are to be held with respect to the supply voltage. The sensed signal is used in a correlative measurement of speed or travel time.

18 Claims, 4 Drawing Sheets

U.S. Patent Jun. 21, 1988 4,752,727

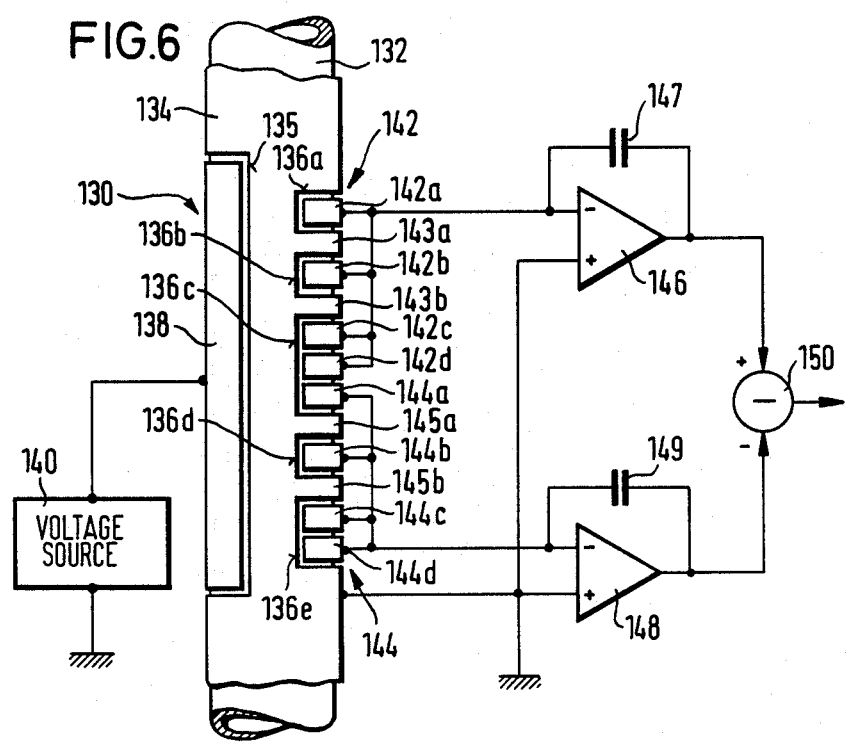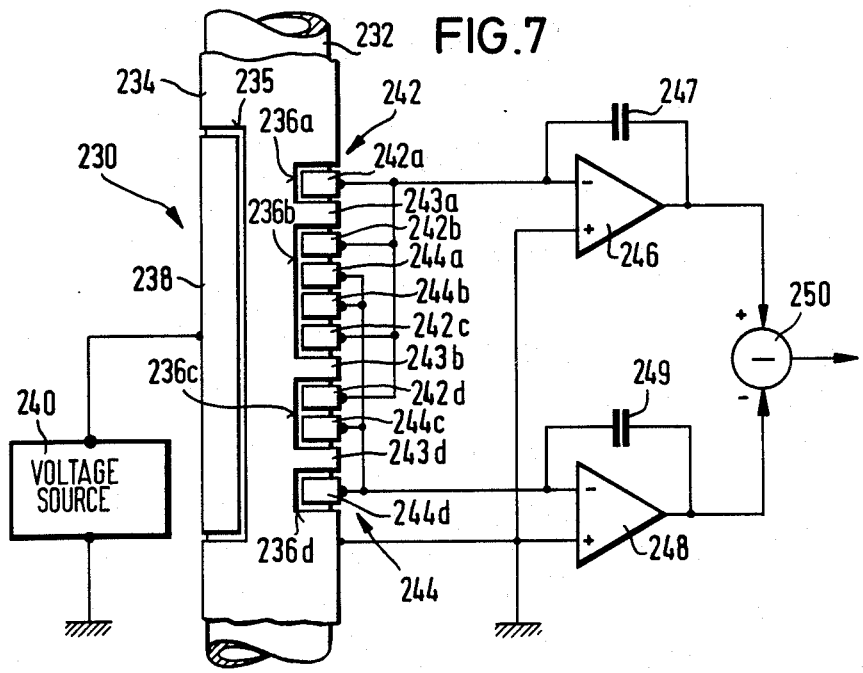

ARRANGEMENT FOR DETECTING SPATIAL INHOMOGENEITIES IN A DIELECTRIC

The invention relates to an arrangement for detecting spatial inhomogeneities in a dielectric, in particular for correlative travel time or velocity measurement.

Arrangements of this type are known for example from DE-OS No. 3,235,750. Whereas capacitive sensors which are used as proximity sensors or filling level limit switches generally need to respond only to a change of the mean total capacitance, there are uses in which spatial inhomogeneities of the dielectric must be detected with the greatest possible resolution and the most accurate possible spatial localization. This means that the local frequency filter formed by the capacitive sensor must have an upper limit frequency as high as possible. This requirement exists in particular in the correlative travel time or velocity measurement with capacitive sensors. As is known, the principle of correlative travel time or velocity measurement is to obtain signals with the aid of two sensors lying spaced apart in the direction of movement from random fluctuations of the moving medium, form the cross correlation function of the two signals and from the position of the maximum of the cross correlation function obtain information on the travel time or velocity of the medium. The capacitive sensors generally employed for this purpose consist of two opposed electrodes between which the dielectric whose spatial inhomogeneities are to be detected is disposed. DE-OS No. 3,235,750 describes how by dividing the two electrodes into sub-electrodes and coded arrangement of the sub-electrodes simultaneously a high limit frequency of the local frequency filter formed by the electrodes and a good sensitivity of the capacitive sensor can be obtained.

The signals obtained with these known capacitive sensors contain a large dc signal component compared with which the useful signal components originating from the spatial inhomogeneities of the dielectric are generally very small. In each individual capacitive sensor the dc signal component originates primarily from the mean basic capacitance on which are superimposed the capacitance fluctuations caused by the spatial inhomogeneities. Particularly troublesome are dc signal fluctuations caused for example by fluctuations of the supply voltage or by external interfering influences and frequently substantially larger than the useful signal fluctuations caused by the inhomogeneities. The suppression of the dc signal components and the dc signal fluctuations requires considerably expenditure in the connected signal processing circuits.

In DE-OS Nos. 2,544,822 and 2,544,825 for the case of correlative travel time or velocity measurement with optical scanning it is stated that a dc signal suppression can be obtained by forming the difference of the output signals of two optical sensors spaced apart in the movement direction. This is readily possible with optical sensors because optical sensors do not mutually influence each other however close together they may be arranged.

In contrast, the effectiveness and accuracy of capacitive sensors depends on the homogeneity of the electrical field between the electrodes. The homogeneity of the field is disturbed if electrodes arranged close together due to spatial inhomogeneities of the dielectric assume different potentials varying with time. The field distortions caused thereby impair the spatial resolving power of the capacitive sensor and prevent a complete dc signal suppression. Consequently, it is not possible to apply the step known in optical sensors of dc signal suppression by forming the difference directly to capacitive sensors.

The problem underlying the invention is the provision of an arrangement with which spatial inhomogeneities in a dielectric can be detected with great resolving power and with complete dc signal suppression.

According to the invention this is achieved in that with a common transmitting electrode fed by an electrical voltage source at least one pair of sensor electrodes is associated and that to the sensor electrodes of each pair an electronic circuit is connected which generates an output signal corresponding to the difference of the displacement currents induced in the sensor electrodes and which maintains the sensor electrodes at any instant at the same potential with respect to the supply voltage.

In the arrangement according to the invention the two sensor electrodes of each pair may be arranged as close together as desired without mutually influencing each other and causing field distortions because they are always maintained at the same potential with respect to the supply voltage applied to the joint transmitting electrode. This is in turn only possible because the connected electronic circuit does not respond to the electrode voltage but to the displacement currents induced in the sensor electrodes. Thus, in the output signal corresponding to the difference of the displacement currents all the dc signal components and all the disturbing influences acting in the same manner on the two sensor electrodes of the pair are completely suppressed. Furthermore, the arrangement according to the invention gives a very precise localization of each inhomogeneity with respect to the centre of the gap between the two adjacent sensor electrodes of each pair, it being possible to make this gap very narrow because of the absence of any mutual influencing of the sensor electrodes.

The construction according to the invention permits in very simple manner the use of guard electrodes because they can simply be held at the same potential as the sensor electrodes with respect to the supply voltage. Other steps for increasing the resolving power and sensitivity may also be employed, such as the division of the sensor electrodes into sub-electrodes which are arranged nested and/or coded.

Figure 2:
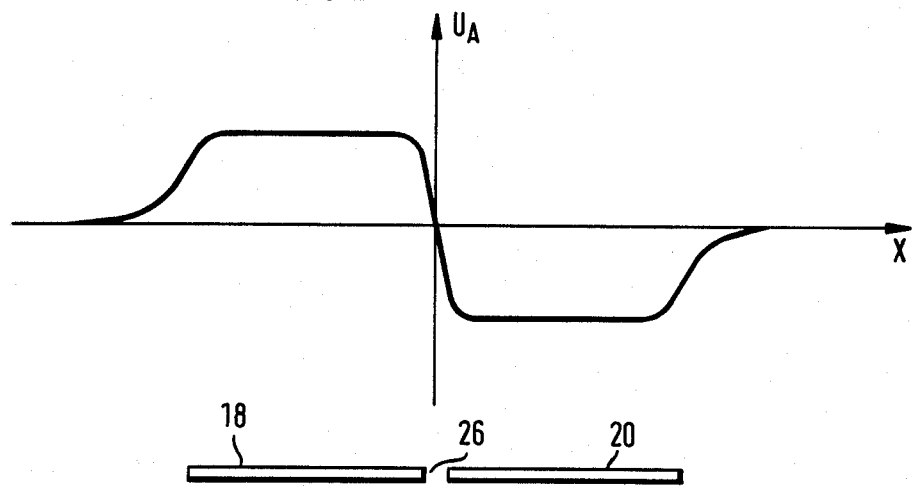
Figure 3:
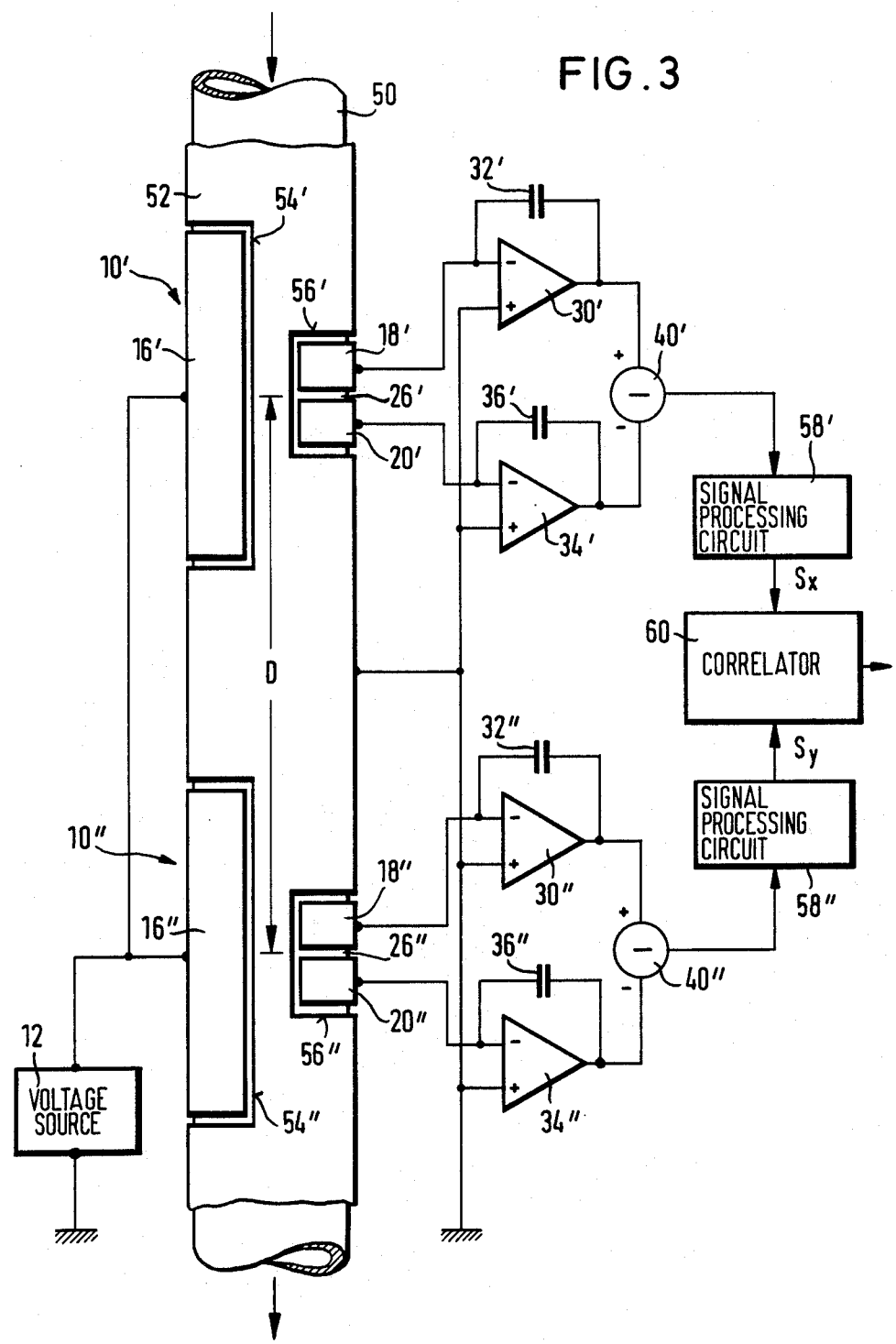
Figure 4:
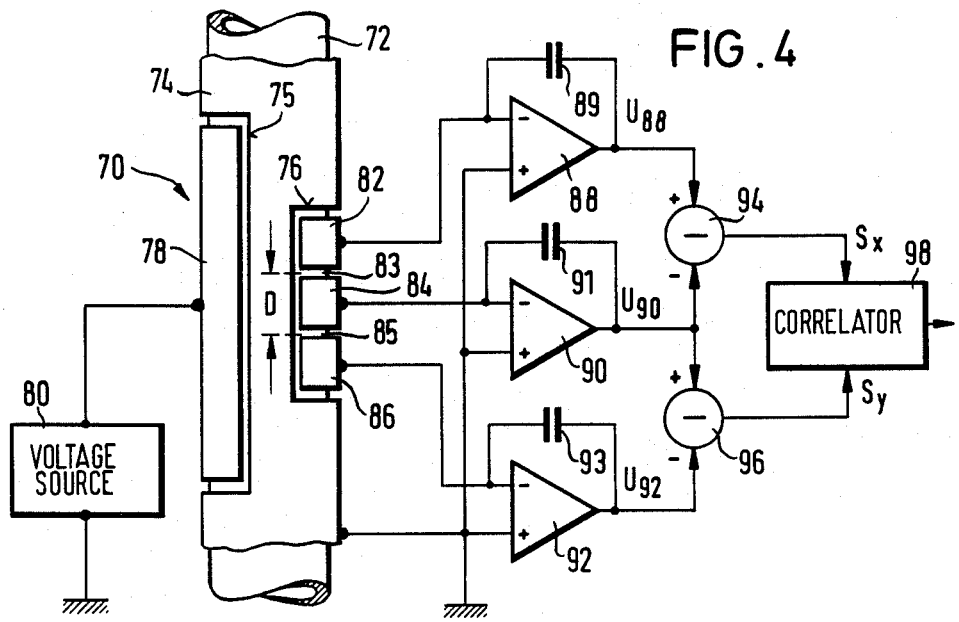
Figure 5:
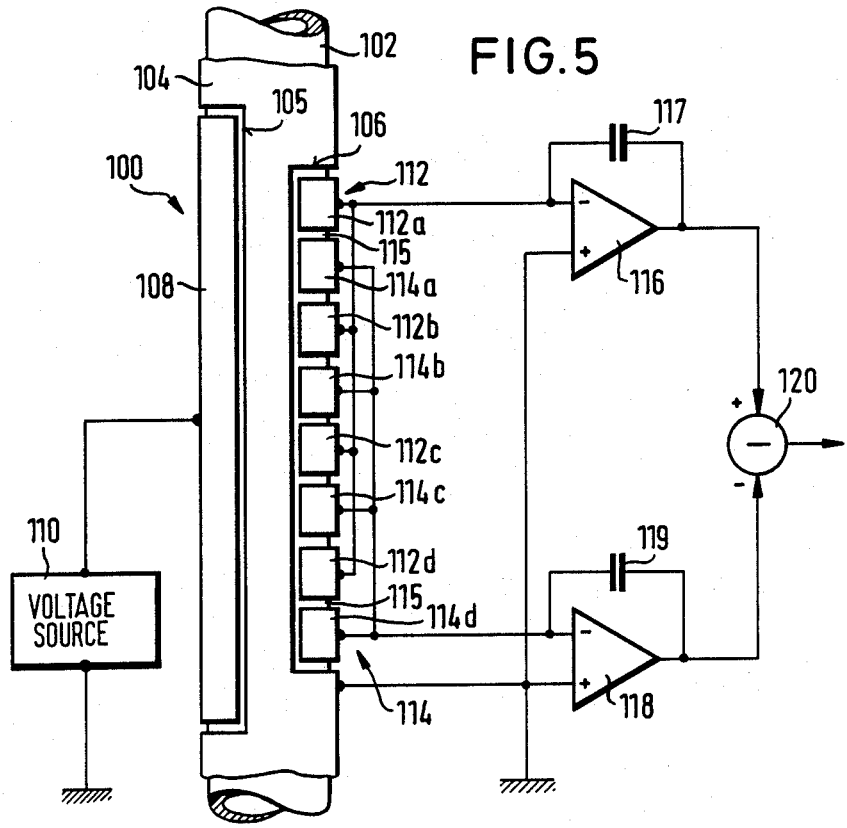

Further features and advantages of the invention will be apparent from the following description of examples of embodiment illustrated in the drawings, wherein:

FIG. 1 is the schematic circuit diagram of the capacitive sensor and the connected electronic circuit in an arrangement for detecting spatial inhomogeneities in a dielectric according to the invention, FIG. 2 is a diagram for explaining the mode of operation of the arrangement of FIG. 1, FIG. 3 is an arrangement for correlative travel time or velocity measurement with two capacitive sensors of the type shown in FIG. 1, FIG. 4 is a modified embodiment of the arrangement for correlative travel time or velocity measurement using a capacitive sensor having three electrodes, FIG. 5 is a modified embodiment of the capacitive sensor of the arrangement according to the invention comprising sensor electrodes divided into nested sub-electrodes, FIG. 6 is a modified embodiment of the arrangement according to the invention in which the sensor electrodes are divided into sub-electrodes which are arranged in accordance with a predetermined coding, and FIG. 7 is a modified embodiment of the arrangement of FIG. 6 in which the sub-electrodes arranged coded are partially nested.

FIG. 1 shows diagrammatically elementary basic makeup of the arrangement for detecting spatial inhomogeneities in a dielectric. It includes a capacitive sensor 10, an electrical voltage source 12 and an electronic circuit 14.

The capacitive sensor 10 includes a transmitting electrode 16 and a pair of sensor electrodes 18, 20 which lie opposite the transmitting electrode 16 spaced a distance d therefrom. Between the transmitting electrode 16 on the one hand and the sensor electrodes 18, 20 on the other there is the dielectric 22 whose spatial inhomogeneities are to be detected. The axis X extending in the plane of the drawing vertically from the top to the bottom represents the measuring direction, i.e. the direction in which the position or movement of spatial inhomogeneities of the dielectric 22 is to be detected. As example of a spatial inhomogeneity a particle 24 is shown which moves with the velocity v in the direction of the axis X, either jointly with the dielectric 22 or relatively to the latter when the dielectric is at rest.

The transmitting electrode 16 has in the measuring direction X a length L which is greater than the spacing d. The sensor electrodes 18, 20 are arranged adjacent each other in the measuring direction X in such a manner that between them there is a narrow gap 26 whose width b is small compared with the length L of the transmitting electrode 16 and compared with the electrode spacing d. The extent of the sensor electrodes 18 and 20 in the measuring direction may have any magnitude but must always be large compared with the gap width b.

It is immediately apparent that the transmitting electrode 16 forms with each sensor electrode 18 and 20 a capacitor whose capacitance depends on the electrode dimensions, the electrode spacing d and the dielectric constant of the dielectric disposed between the electrodes.

The voltage source 12 applies to the transmitting electrode 16 an electrical voltage with respect to a reference potential which in the illustration of FIG. 1 is ground potential.

Each sensor electrode 18, 20 is connected to an input 14a and 14b respectively of the electronic circuit 14. The electronic circuit 14 is so constructed that is fulfils the following functions:

1. It responds to displacement currents which are induced due to the voltage applied to the transmitting electrode 16 or by static charges in each sensor electrode 18, 20 (a separation of the influencing variables can be effected by choice of suitable voltage sources 12 and associated processing of the signal $U_A$;
2. it furnishes at its output 14c a signal which corresponds to the difference of the displacement currents induced in the two sensor electrodes 18 and 20;
3. it holds the sensor electrodes 18, 20 at the same potential with respect to the supply voltage applied to the transmitting electrode 16.

These functions are fulfilled in very simple manner by the makeup of the electronic circuit 14 illustrated in FIG. 1.

The sensor electrode 18 is connected via the input 14a to the inverting input of an operational amplifier 30 in the feedback circuit of which a capacitor 32 is disposed with which a resistor 33 may be connected in parallel. In the same manner the sensor electrode 20 is connected to the inverting input of an operational amplifier 34 in the feedback circuit of which a capacitor 36 lies with which a resistor 37 may be connected in parallel. The non-inverting inputs of the two operational amplifiers are at the potential at which the sensor electrodes are to be maintained with respect to the supply voltage. In the simplest case this may be the ground potential as indicated in FIG. 1. The outputs of the two operational amplifiers 30 and 34 are connected to the two inputs of a differential circuit 40 which form the difference between the output signals of the two operational amplifiers. The output of the difference circuit 40 represents the output 14c of the electronic circuit 14.

It is immediately apparent to the expert that the circuit described fulfils the functions indicated above in excellent manner:

1. As is known, an operational amplifier connected as inverter adjusts its output voltage always so that the current flowing via the feedback is equal to the current supplied to the inverting input. In the arrangement of FIG. 1 the current supplied to the inverting input of each operational amplifier is the displacement current induced in the connected sensor electrode. Thus, the output voltage of the operational amplifier is proportional to the induced displacement current.

Let $U_G$ be the supply voltage applied by the current source 12 to the transmitting electrode 16, and it will first be assumed that this is an ac voltage of frequency $f_G$;

$C_{18}$ be the capacitance between the transmitting electrode 16 and the sensor electrode 18;

$C_{32}$ be the capacitance of the capacitor 32 in the feedback circuit of the operational amplifier 30;

$R_{33}$ the resistance of the resistor 33;

$U_{30}$ the output voltage of the operational amplifier 30;

$C_{20}, C_{36}, R_{37}, U_{34}$ the corresponding quantities for the sensor electrode 20 and the circuit part connected thereto.

The resistances $R_{33}, R_{37}$ are so large that they are negligible; this condition is fulfilled for:

$$R_{33} >> \frac{1}{2\pi f_G \cdot C_{18}} \; ; \; R_{37} >> \frac{1}{2\pi f_G \cdot C_{20}}$$

The voltages then obtained at the outputs of the operational amplifiers 30 and 34 are $$U_{30} = -\frac{C_{18}}{C_{32}} \cdot U_G \qquad (1)$$

$$U_{34} = -\frac{C_{20}}{C_{36}} \cdot U_G \qquad (2)$$

2. The difference circuit 40 forms the difference of the two voltages $U_{30}$ and $U_{34}$ and thus furnishes at the output a voltage $U_A$ for which:

$$U_A = U_{30} - U_{34} = \left( \frac{C_{20}}{C_{36}} - \frac{C_{18}}{C_{32}} \right) \cdot U_G \quad (3)$$

3. A negative feedback operational amplifier of course always adjusts its output voltage so that the voltage between the two inputs (apart from a very small control deviation) becomes practically zero. The inverting input is thus held virtually at the potential of the non-inverting input. In the circuit of FIG. 1 the sensor electrodes 18, 2 0 are connected directly to the inverting inputs of the operational amplifiers 30 and 34 respectively; they are thus held virtually at the potential of the non-inverting inputs which in accordance with the illustration of FIG. 1 is for example the ground potential. Since the ground potential is at the same time the reference potential for the voltage applied by the voltage source 12 to the transmitting electrode 16, the two sensor electrodes 18, 20 are held at the same potential with respect to the supply voltage applied to the transmitting electrode 16.

The sensor arrangement illustrated in FIG. 1 has due to its structure and connection the following mode of operation:

If the sensor electrodes 18 and 20 have the same dimensions and are arranged with respect to the transmitting electrode 16 in identical manner and if it is first assumed that the dielectric 22 between the electrodes is homogeneous, the capacitances $C_{18}$ and $C_{20}$ are of equal magnitude. If furthermore the two sensor electrodes 18, 20 are connected in identical manner, if in particular the capacitances $C_{32}$ and $C_{36}$ of the feedback capacitors 32 and 36 are of equal magnitude, the output voltages $U_{30}$ and $U_{34}$ in accordance with the above equations (1) and (2) are also of equal magnitude. Consequently, under these conditions the output voltage $U_A$ of the difference circuit 40 has the value zero. This means that the dc signal components contained in the signals taken from the two sensor electrodes 18 and 20 are suppressed in the output signal $U_A$. In particular, all interfering influences having the same effect on the signals of the two sensor electrodes 18 and 20 are also suppressed in the output signal $U_A$.

This effect is obtained moreover not only when the dielectric 22 is completely homogeneous but also with an inhomogeneous dielectric if the inhomogeneities are statistically distributed in such a manner that the mean capacitances of the sensor electrodes 18 and 20 have the same magnitude. This can for example be the case when the dielectric 22 contains a great number of fine uniformly distributed particles. The configuration described thus gives an equalization of the mean basic capacitance, independent of the capacitive load.

If however a spatial inhomogeneity of the dielectric 22 occurs which upsets the equilibrium of the mean capacitances $C_{18}$ and $C_{20}$ of the two sensor electrodes 18, 20, as indicated in FIG. 1 by the particle 24, the capacitances $C_{18}$ and $C_{20}$ vary differently in dependence upon the position of the inhomogeneity along the measuring axis X. The output signal $U_A$ of the difference circuit 40 then assumes a value depending on the capacitance difference in accordance with the above equation (3).

FIG. 2 shows as example the output signal $U_A$ of the difference circuit 40 as a function of the position of a particle along the measuring axis X. The origin of the coordinate system corresponds to the middle of the gap 26 between the two sensor electrodes 18, 20 which are shown for comparison beneath the X axis.

If the particle in the direction of the measuring axis X is at a relatively great distance from the two sensor electrodes 18 and 20 the output signal $U_A$ has the value zero because then the effect of the particle on the two sensor electrodes is very small and approximately identical.

As the particle approaches the sensor electrode 18 the output voltage rises In the positive direction until it reaches a maximum value which it retains substantially during the entire passage of the particle past the sensor electrode 18.

When the particle reaches the gap 26 the output signal $U_A$ declines sharply and passes through zero when the particle is symmetrical to the middle of the gap 26. On the other side of the zero passage the output signal $U_A$ approaches with the same steepness a negative maximum value which it retains substantially during the entire passage of the particle past the sensor electrode 20.

From the zero passage of the output signal $U_A$ taking place at steep gradient the centre position of the particle 24 with respect to the gap 26 can be determined with great accuracy. For this, only the position of the particle in the measuring direction X is decisive and the position which the particle assumes relatively to the sensor plates transversely of the measuring direction has no influence on the measurement result. The gradient in the vicinity of the zero passages is at all points transversely of the measuring direction X a maximum centrally over the gap. Thus, a planar X plane exists in which the sensor output voltage assumes the value zero.

The advantageous properties outlined of the sensor arrangement result primarily from the good homogeneity of the electrical field in the capacitive sensor 10 and above all in the central region containing the gap 26. The fact contributing decisively to the homogeneity of the electrical field is that the width b of the gap 26 is very small compared with the length L of the transmitting electrode 16 because this avoids edge distortions of the electrical field in the region of the gap. In addition, the small width b of the gap 26 gives a very narrow measuring range with correspondingly steep gradient. In practice the width of the gap 26 can be reduced to about 1% of the spacing d according to FIG. 1.

However, the homogeneity of the electrical field depends above all on the electrodes opposite the transmitting electrode 16 being kept over the greatest possible extent on both sides of the gap 26 at the same potential with respect to the supply voltage. In the example of embodiment of FIG. 1 this is achieved in that the two sensor electrodes 18, 20, which are virtually held at ground potential, have themselves a considerable extent in the measuring direction X. It will be explained later that in cases where the sensor electrodes to obtain a small measuring volume are to have only a small extent in the measuring direction the same effect can be obtained with an additional guard electrode which adjoins the sensor electrodes, the guard electrode and the sensor electrode being held at the same potential with respect to the supply voltage. In all cases this achieves that edge distortions of the electrical field are kept as far away as possible from the gap 26.

In addition to the homogeneity outlined of the electrical field the use of a single fed transmitting electrode in conjunction with two (or possibly even more) sensor electrodes ensures that no errors can be caused by irregularities of the voltage supply. Since the two sensor electrode circuits are fed with the same voltage a complete voltage symmetry and, when the voltage is an ac voltage, a frequency-locked and phase-locked coupling is ensured. This effect is independent of the properties of the dielectric, in particular of its loss factor. In addition, this measure has the advantage of low expenditure because only one voltage source is required.

As apparent from the curve of FIG. 2 the formation of the difference of the signals obtained at the sensor electrodes has the effect of a local frequency filter with bandpass characteristic and as a result in particular the dc signal components in the output signal are suppressed. This simplifies the signal processing because an electronic filtering can be largely dispensed with. The local frequency response can be influenced by the geometry of the sensor electrodes.

Hitherto, nothing has been said about the nature of the voltage source 12. Since the arrangement responds to the displacement currents induced in the sensor electrodes it can be operated both with dc voltage and with ac voltage of any desired frequency and curve form (e.g. sinusoidal voltage, rectangular voltage, etc.). If the arrangement is also to respond to slowly moved or stationary inhomogeneities in the dielectric or the influence of static charges is to be eliminated, the transmitting electrode must be fed with an ac voltage. If a dc voltage is used as supply voltage displacement currents are induced only by the movement of the inhomogeneities or, if these are charged particles, by the movement of the electrostatic charges. The signal processing depends of course on the nature of the supply and is obvious to any expert. For example, when a supply voltage of rectangular or sinusoidal form is used a phase-sensitive rectification or a corresponding phase-locked mixing down by SC filters (switched capacitor filters) may be employed.

There are also no restrictions as regards the choice of the potential at which the sensor electrodes are held. In the example of embodiment of FIG. 1 this potential is ground potential. This solution is usually an obvious one but it is in no way compulsory. In particular, it should be remembered that the potential of the sensor electrodes need not be absolutely defined but only with respect to the supply voltage. If for example the supply voltage is an ac voltage the sensor electrodes are to be kept at the same potential with respect to this ac voltage but as regards dc voltage they may certainly be at different potentials. Conversely, with a dc voltage supply the sensor electrodes are held at the same dc potential but may have different ac potentials. The same also applies to the potential of an additional guard electrode if one is used, as will be described below.

The sensor arrangement of FIG. 1 can be used advantageously for all purposes where conventional capacitive sensors are also used for detecting inhomogeneities in a dielectric and compared with these conventional sensors they have the advantage of dc signal suppression and improved spatial resolving power. A preferred use of such capacitive sensors is to obtain random signals suitable for correlative signal processing as required in particular for contactless travel time or velocity measurement. As is known, the principle of correlative travel time or velocity measurement resides in picking up random signals with the aid of the usually contactless sensors at two points of the moved process spaced apart from each other in the direction of movement, forming the cross correlation function of the two signals and from the position of the maximum of the cross correlation function obtaining information on the travel time or velocity of the moved process. The use of capacitive sensors is an obvious one when the moved process comprises inhomogeneities in a dielectric. A typical example of this is the pneumatic transport of granular or pulverulent solids.

FIG. 3 shows as example for this use the correlative measurement of the velocity of a medium transported through a pipe 50 with the aid of two capacitive sensors of the type illustrated in FIG. 1. To facilitate understanding the parts of each sensor arrangement are designated with the same reference numerals as in FIG. 1, which for the one sensor arrangement are provided with one apostrophe and for the other sensor arrangement with two apostrophes These components have the same functions as in the arrangement of FIG. 1 and consequently do not have to be explained again in detail.

However, the arrangement of FIG. 3 has the following special features:

The two capacitive sensors 10' and 10" are arranged along the pipe 50 in such a manner that the gaps 26' and 26" between their sensor electrodes 18', 20' and 18", 20" respectively are at a defined spacing D from each other.

The transmitting electrodes 16', 16" and the sensor electrodes 18', 20', 18", 20" lie at the peripheral surface of the pipe 50 and are correspondingly curved. Of course, the pipe 50 consists of a dielectric material. Due to the curvature the spacing between each transmitting electrode and the sensor electrodes opposite it is not constant. However, an "effective" spacing can be defined which would be the spacing of equivalent planar electrodes.

The dimensions of the sensor electrodes 18', 20', 18", 20" in the measuring direction, i.e. parallel to the axis of the pipe 50, are substantially smaller than the length of the transmitting electrodes 16', 16" in the same direction.

The two transmitting electrodes 16', 16" are fed jointly by the voltage source 12.

Placed round the dielectric tube 20 is a guard sheath 52 having cutouts 54', 54" and 56', 56". In the cutouts 54', 54" the transmitting electrodes 16' and 16" are disposed and in the cutouts 56', 56" the sensor electrodes 18', 20' and 18", 20" are arranged. The cutouts are so dimensioned that the width of the gaps between the electrodes and the guard surrounding them is very small. This width is preferably of the order of magnitude of the width of the gaps 26', 26" between the sensor electrodes, i.e. for example about 1% of the effective electrode spacing.

The guard sheath 52 and the sensor electrodes 18', 20', 18", 20" are held at the same potential with respect to the voltage source 12. In the example of embodiment illustrated this is effected simply by connecting the guard sheath directly to ground. The guard sheath is thus at a fixed potential with respect to the voltage source 12 at which the sensor electrodes are also virtually held.

The output signals of the two difference circuits 40', 40" are supplied to the two inputs of a correlator 60 as the signals $S_x$ and $S_y$ to be correlated. If the correlator 60 is so constructed that it can process the output signals of the difference circuits 40', 40" directly, its inputs can be connected directly to the outputs of the difference circuits. Otherwise, as illustrated in FIG. 3 between the output of each difference circuit and the associated input of the correlator 60 a signal processing circuit 58' or 58" is inserted which brings the output signals of the difference circuit into a form suitable for processing by the correlator. In the manner known in correlative travel time or velocity measurement the correlator 60 forms the cross correlation function of the two signals $S_x$ and $S_y$ by multiplying instantaneous values of the signal $S_y$ by instantaneous values of the signal $S_x$ delayed by variable displacement times and forming the mean of the products over a predetermined observation time. For each value of the displacement time a support value of the cross correlation function is obtained. In the use illustrated the cross correlation function has a maximum at a certain displacement time which is equal to the travel time of the medium from the sensor 10' to the sensor 10". This is based on the fact that the spatial inhomogeneities of the dielectric on passage through the two sensors produce in the output signals fluctuations which have certain similarities. Since the spacing D of the two sensors 10' and 10" is known exactly it is easy to calculate from the travel time determined the flow velocity of the medium.

Since the sensor electrodes and the guard sheath are maintained at the same potential the guard sheath 52 has the known function of the guard electrode already referred to by Kelvin by which the influence of the stray capacitances is eliminated and field distortions due to edge effects avoided. Whereas however generally the voltage between the capacitor electrodes fluctuates and therefore the guard potential must be made to follow the potential of a capacitor electrode, the arrangement described has the special feature that the transmitting electrode on the one hand and the sensor and guard electrodes on the other each lie at fixed potential. This is possible because the detection of the inhomogeneities of the dielectric is not based on the measurement of the electrode voltage of the capacitive sensor but on the measurement of the displacement currents induced in the sensor electrodes.

The use of the principle of the guard electrode makes it possible in particular to reduce the dimensions of the sensor electrodes in the measuring direction without the homogeneity of the electrical field in the capacitive sensor being lost. It is possible to influence thereby the local frequency response of the local frequency filter formed by the two sensor electrodes in the difference circuit.

Since the transmitting electrodes 16', 16" lie at a different potential to the guard sheath 52 there are of course edge distortions of the electrical field at the interfaces between each transmitting electrode and the guard sheath. To eliminate the effect of these field distortions on the measurement result the large dimension of the transmitting electrodes in the measuring direction (parallel to the pipe axis) is retained. This ensures that the homogeneity of the electrical field in the region of the sensor electrodes and in particular in the region of the gap between the sensor electrodes in not impaired by the edge distortions at the transmitting electrodes.

FIG. 4 shows a modified embodiment of an arrangement for correlative velocity measurement which at the same time is an example of the case where more than two sensor electrodes are associated with a common transmitting electrode.

The medium whose flow velocity is to be measured with the aid of a capacitive sensor 70 is conveyed through a dielectric pipe 72 on the peripheral surface of which at least in the region of the capacitive sensor 70 a guard sheath 74 is disposed which is provided with cutouts 75 and 76. Disposed in the cutout 75 is a transmitting electrode 78 which is connected to a voltage source 80. In the cutout 76 three sensor electrodes 82, 84, 86 are arranged in the measuring direction (parallel to the pipe axis) in such a manner that between them narrow gaps 83 and 85 are obtained. The dimensions of the electrodes and the cutouts correspond to the rules explained with the aid of FIG. 3. The dimension of the transmitting electrode 78 in the measuring direction is substantially greater than the extent of the region taken up by the three sensor electrodes 82, 84, 86. The cutouts 75 and 76 are so dimensioned that the gaps between the electrodes and the guard sheath are very narrow.

The sensor electrodes 82, 84, 86 are connected in the same manner as the sensor electrodes in the previously described examples of embodiment. Thus, the sensor electrode 82 is connected to the inverting input of an operational amplifier 88 in the feedback circuit of which a capacitor 89 lies. The sensor electrode 84 is connected to the inverting input of an operational amplifier 90 in the feedback circuit of which a capacitor 91 lies and the sensor electrode 86 is connected to the inverting input of an operational amplifier 92 in the feedback circuit of which a capacitor 93 lies. The non-inverting inputs of the three operational amplifiers 88, 89, 92 and the guard sheath 72 lie at the same potential which in the example described is ground potential. For simplicity the resistors possibly connected in the feedback circuits of the operational amplifiers parallel to the capacitors are not shown in FIG. 4.

The two inputs of a difference circuit 94 are connected to the outputs of the operational amplifiers 88 and 90 in such a manner that the output signal of the operational amplifier 90 is subtracted from the output signal of the operational amplifier 88. The two inputs of a difference circuit 96 are connected to the outputs of the operational amplifiers 90 and 92 in such a manner that the output signal of the operational amplifier 92 is subtracted from the output signal of the operational amplifier 90. The output signals of the two difference circuits 94, 96 are supplied to the two inputs of a correlator 98 as the signals $S_x$ and $S_y$ to be correlated. For simplicity FIG. 4 does not show the signal processing circuits possibly between the difference circuits and the correlator.

If the output voltages of the operational amplifiers 88, 90, 92 are designated in accordance with the above method by $U_{88}$, $U_{90}$, $U_{92}$, the following equations apply to the output signals of the difference circuits 94, 96:

$$S_x = U_{88} - U_{90}$$

$$S_y = U_{90} - U_{92}$$

The three sensor electrodes of FIG. 4 thus form two pairs which have the middle sensor electrode in common. The signals obtained in this manner with three sensor electrodes have for the correlation basically the same properties as the signals obtained with the arrangement of FIG. 3 with four sensor electrodes but with the difference that the spacing D decisive for the travel time or velocity measurement is now the spacing between the centres of the gaps 83 and 85 which is substantially smaller than the spacing D between the centres of the two capacitive sensors 10' and 10" in the arrangement of FIG. 3. The reduction of the measurement path is advantageous for the signal correlation because the existing similarities of the inhomogeneities of the dielectric at the two measuring points become smaller with increasing travel time. The maximum of the cross correlation function obtained with the arrangement of FIG. 4 is thus substantially more pronounced than with the arrangement of FIG. 3. In addition, the embodiment of FIG. 4 has the essential advantage of a considerably smaller space requirement in the measuring direction. Furthermore, the electrode structure is simpler and the circuitry expenditure reduced.

The step explained with the aid of FIG. 4 can also be extended to sensor arrangements having more than two sensor electrodes by forming two pairs from each group of three sensor electrodes, the centre electrodes being common to the two pairs.

The reduction of the extent of the sensor electrodes in the measuring direction made possible in the arrangements of FIGS. 3 and 4 by the additional use of a screen electrode operating on the guard principle admittedly has the advantage of a favourable influencing of the local frequency response of the local frequency filter formed by the sensor electrodes by extending the frequency range towards higher frequencies, but at the same time this reduces the sensitivity because the effective measurement volume (the "aperture") of each sensor electrode is correspondingly smaller. It is known to obviate this disadvantage by dividing each sensor electrode into sub-electrodes which are connected electrically together, the sub-electrodes of two (or more) sensor electrodes being nested. The aperture of each sensor electrode decisive for the sensitivity then corresponds to the sum of the apertures of the sub-electrodes whilst for the local frequency response the dimensions of the sub-electrodes are decisive. This principle may also be applied to the sensor arrangements described here, retaining all the advantages of the sensor electrodes maintained virtually at the same potential and of the guard electrode optionally maintained at the same potential.

FIG. 5 shows as example a capacitive sensor 100 which is disposed on a dielectric pipe 102 and formed with divided sensor electrodes. The outer surface of the pipe 102 is again surrounded at least in the area occupied by the capacitive sensor 100 by a guard sheath 104 which is provided with cutouts 105 and 106. Disposed in the cutout 105 is a transmitting electrode 108 which is connected to a voltage source 110. Arranged in the cutout 106 are two sensor electrodes 112, 114. The sensor electrode 112 is divided into four sub-electrodes 112a, 112b, 112c, 112d and the sensor electrode 114 is divided into four sub-electrodes 114a, 114b, 114c, 114d. The sub-electrodes are nested such that in the measuring direction (parallel to the axis of the pipe 102) the sub-electrodes of the one sensor electrode alternate regularly with the sub-electrodes of the other sensor electrode. Between the successive sub-electrodes there are narrow gaps 115.

The four sub-electrodes 112a, 112b, 112c, 112d of the sensor electrode 112 are connected electrically together and to the inverting input of an operational amplifier 116 in the feedback circuit of which there is a capacitor 117. In the same manner the four sub-electrodes 114a, 114b, 114c, 114d of the sensor electrode 114 are connected together and to the inverting input of an operational amplifier 118 in the feedback circuit of which there is a capacitor 119. The non-inverting inputs of the two operational amplifiers 116, 118 and the guard sheath 104 lie at the same potential which in the example illustrated is ground potential. The outputs of the operational amplifiers 116 and 118 are connected to inputs of a difference circuit 120.

The arrangement of FIG. 5 combines the advantages of the capacitive sensors with sensor electrodes divided into nested sub-electrodes with the advantages of the sensor electrodes maintained virtually at the same potential with respect to the voltage source. The division and nesting of the sensor electrodes can of course also be applied in sensor arrangements having more than two sensor electrodes, for example in a sensor arrangement having three sensor electrodes of the type shown in FIG. 4.

Instead of regularly arranging the sub-electrodes of each sensor electrode as in the arrangement of FIG. 5, to obtain a desired local frequency response they may also be arranged in accordance with a predetermined coding. Examples of this are shown in FIGS. 6 and 7.

The capacitive sensor 130 illustrated in FIG. 6 is disposed on the outside of a dielectric pipe 132 which carries at least in the region of the capacitive sensor a guard sheath 134. In a cutout 135 of the guard sheath 134 a transmitting electrode 138 is disposed and is connected to a voltage source 140.

The transmitting electrode 138 is opposite to sensor electrodes 142 and 144 each divided into sub-electrodes. The sub-electrodes of each sensor electrode are arranged in accordance with a spatial coding in such a manner that between specific sub-electrodes there are gaps which correspond to a missing sub-electrode. Thus, in the sensor electrode 142 between the sub-electrodes 142a and 142b there is a code gap 143a and between the sub-electrodes 142b and 142c a further code gap 143b, whereas the sub-electrodes 142c and 142d are directly adjacent each other. The sensor electrode 144 is formed in identical manner. It thus includes a code gap 145a between the sub-electrodes 144a and 144b and a further code gap 145b between the sub-electrodes 144b and 144c.

If the binary value "1" is assigned to each sub-electrode and the binary value "0" to each code gap, then each of the two sensor electrodes 142 and 144 of FIG. 6 is obviously coded to the binary coded 101011.

The guard sheath 134 has cutouts 136a, 136b, 136c, 136d and 136e in which lie respectively the sub-electrodes present to form narrow gaps. On the other hand, the code gaps are filled by portions of the guard sheath 134. This ensures that the guard effect is retained also in the code gaps and consequently any field distortion in the region of the sensor electrodes avoided.

The sub-electrodes 142a, 142b, 142c, 142d of the sensor electrode 142 are connected together and to the inverting input of an operational amplifier 146 whose feedback circuit contains a capacitor 147. In the same manner the sub-electrodes 144a, 144b, 144c, 144d of the sensor electrode 144 are connected together and to the inverting input of the operational amplifier 148 which contains in the feedback circuit a capacitor 149. The non-inverting inputs of the two operational amplifiers 146 and 148 and the guard sheath 144 are connected to ground. The outputs of the operational amplifiers 146 and 148 are connected to the two inputs of a difference circuit 150.

In the embodiment of FIG. 6 the capacitive sensor, depending on the "digit number" of the coding selected, can have a considerable length in the measuring direction. This extent can be reduced by partial or complete nesting of the sub-electrodes if the coding chosen permits. It is to be remembered that the nested sub-electrodes of a sensor electrode, being maintained virtually at the same potential as the guard electrode, represent code gaps for the other sensor electrode. A nesting is therefore only possible in so far as the sub-electrodes of the two sensor electrodes can be accommodated in each case in code gaps of the other sensor electrode.

FIG. 7 shows an example of embodiment of a coded capacitive sensor corresponding to the embodiment of FIG. 6 but with partially nested sub-electrodes. To avoid repetitions the components of the arrangement of FIG. 7 are designated by reference numerals which are 100 higher than the reference numerals of the corresponding components of FIG. 6.

As can be seen the sub-electrodes 242c and 242d lie in code gaps of the sensor electrode 244 and the sub-electrodes 244a and 244b lie in code gaps of the sensor electrode 242. The then remaining code gaps are again filled by portions of the guard sheath 234.

With the above assignment of the binary values the following codings thus result for the two sensor electrodes:

Sensor electrode 242: 10100101
Sensor electrode 244: 11000101.

The shortening obtained of the capacitive sensor is directly apparent from FIG. 7. Since each of the two codings consist of eight code elements the separate arrangement of the two sensor electrodes corresponding to the embodiment of FIG. 6 would occupy a length of sixteen sub-electrodes. This length is reduced in the embodiment of FIG. 7 to eleven sub-electrodes.

I claim:

1. Arrangement for detecting spatial inhomogeneities in a dielectric for correlative measurement of the travel time or velocity of said inhomogeneities, the arrangement comprising a transmitting electrode fed by an electrical supply voltage, at least one pair of sensor electrodes disposed opposite said transmitting electrode and spaced a distance therefrom so that said spatial inhomogeneities pass through the space between said transmitting electrode and said sensor electrodes, each pair of sensor electrodes including a first and second sensor electrode arrangement in side by side relation extending in the direction of travel of said spatial inhomogeneities and separated in said direction by a gap having a width which is small compared with the dimension of said transmitting electrode in said direction and compared with the effective spacing between said transmitter electrode and said at least one pair of sensor electrodes, and an electronic circuit associated with each pair of sensor electrodes, each electronic circuit including first means connected to its corresponding first sensor electrode for sensing the displacement current induced in said first electrode sensor and maintaining said corresponding first electrode sensor at any instant at a potential with respect to said supply voltage, second means connected to its corresponding second electrode sensor for sensing the displacement current induced in said corresponding second electrode sensor and maintaining said corresponding second electrode sensor at any instant at the same potential as said corresponding first electrode sensor with respect to said supply voltage, and third means for generating an output signal corresponding to the difference of the displacement currents sensed by said first and second means.

2. Arrangement according to claim 1 wherein the sensor electrodes are disposed in cutouts of a guard electrode and the guard electrode and the sensor electrodes are maintained at the same potential with respect to the supply voltage.

3. Arrangement according to claim 2 wherein between each sensor electrode and the guard electrode there is a gap having a width which is small compared with the dimension of the transmitting electrode in said direction of travel and compared with the effective spacing between the transmitting electrode and the sensor electrodes.

4. Arrangement according to claim 1 wherein said first means and said second means each comprise an operational amplifier having an inverting input and a non-inverting input, each sensor electrode being connected to the inverting input of the associated operational amplifier, and the non-inverting input of each operational amplifier lying at the potential at which the sensor electrodes are to be maintained with respect to the said supply voltage.

5. The arrangement according to claim 1, wherein said at least one pair of sensor electrodes includes first and second pairs of sensor electrodes, the second pair is situated in spaced-apart, downstream relation to the first pair in the direction of travel of the spatial inhomogeneities, and output signals provided by each of the third means of the electronic circuits being supplied to a correlator as the signals to be correlated.

6. Arrangement for detecting spatial inhomogeneities in a dielectric for correlative measurement of the travel time or velocity of said inhomogeneities, comprising a transmitting electrode fed by an electrical supply voltage, first, second, and third sensor electrodes disposed opposite said transmitting electrode and spaced a distance therefrom so that said spatial inhomogeneities pass through the space between said transmitting electrode and said sensor electrode, said first and second sensor electrodes being arranged in side by side relation extending in the direction of travel of said spatial inhomogeneities to form a first pair of sensor electrodes and separated in said direction of travel by a first gap having a width which is small compared with the dimension of said transmitting electrode in said direction of travel and compared with the effective spacing between said transmitting electrode and said sensor electrodes, said second and third sensor electrodes being arranged in side by side relation extending in said direction of travel to form a second pair of sensor electrodes and separated in said direction of travel by a second gap having a width which is small compared with the dimension of said transmitting electrode in said direction of travel and compared with the effective spacing between said transmitting electrode and said sensor electrodes, and an electronic circuit including first means connected to said first sensor electrode for sensing the displacement current induced in said first sensor electrode and maintaining said first sensor electrode at any instant at a potential with respect to said supply voltage;

second means connected to said second sensor electrode for sensing the displacement current induced in said second sensor electrode and maintaining said second sensor electrode at any instant at the same potential as said first sensor electrode with respect to said supply voltage;

third means connected to said third sensor electrode for sensing the displacement current induced in said third sensor electrode and maintaining said third sensor electrode at any instant at the same potential as said first and second sensor electrodes with respect to said supply voltage, fourth means for generating an output signal corresponding to the differenceof the displacement currents sensed by said first and second means and fifth means for generating an output signal corresponding to the difference of the displacement currents sensed by said second and third means.

7. Arrangement according to claim 6 wherein the sensor electrodes are disposed in cutouts of a guard electrode and the guard electrode and the sensor electrodes are maintained at the same potential with respect to the supply voltage.

8. Arrangement according to claim 7 wherein between each sensor electrode and the guard electrode there is a gap having a width which is small compared with the dimension of the transmitting electrode in said direction of travel and compared with the effective spacing between the transmitting electrode and the sensor electrodes.

9. Arrangement according to claim 6 wherein said first means, said second means and said third means each comprise an operational amplifier having an inverting input and a non-inverting input, each sensor electrode being connected to the inverting input of the associated operational amplifier, and the non-inverting input of each operational amplifier lying at the potential at which the sensor electrodes are to be maintained with respect to said supply voltage.

10. Arrangement according to claim 6 wherein the output signals of said fourth means and of said fifth means are supplied to a correlator as the signals to be correlated.

11. Arrangement for detecting spatial inhomogeneities in a dielectric for correlative measurement of the travel time or velocity of said inhomogeneities, comprising a transmitting electrode fe1 by an electrical supply voltage, at least one pair of sensor electrodes disposed opposite said transmitting electrode and spaced a distance therefrom so that said spatial inhomogeneities pass through the space between said transmitting electrode and said sensor electrodes, each sensor electrode being divided into a plurality of sub-electrodes, said sub-electrodes being arranged in side by side relation extending in the direction of travel of said spatial inhomogeneities and separated in said direction by gaps having widths which are small compared with the dimension of said transmitting electrode in said direction and compared with the effective spacing between said transmitter electrode and said at least one pair of sensor electrodes, and an electronic circuit including first means connected to the sub-electrodes of one of said sensor electrodes of said pair for generating an output signal corresponding to the sum of the displacement currents induced in said sub-electrodes and maintaining said sub-electrodes at any instant at a potential with respect to said supply voltage;

second means connected to the sub-electrodes of the other sensor electrode of said pair for generating an output signal corresponding to the sum of the displacement currents induced in said sub-electrodes and maintaining said sub-electrodes at any instant at the same potential as the sub-electrodes of said first electrode with respect to said supply voltage and third means for generating an output signal corresponding to the difference of the output signals generated by said first and second means.

12. Arrangement according to claim 11 wherein said sub-electrodes are disposed in cutouts of a guard electrode and the guard electrode and the sub-electrodes are maintained at the same potential with respect to the supply voltage.

13. Arrangement according to claim 11 wherein between each sub-electrode and the guard electrode there is a gap having a width which is small compared with the dimension of the transmitting electrode in said direction of travel and compared with the effective spacing between the transmitting electrode and the sensor electrodes.

14. Arrangement according to claim 11 wherein the sub-electrodes of one sensor electrode are interposed between the sub-electrodes of the other sensor electrode.

15. Arrangement according to claim 11 wherein the sub-electrodes of each sensor electrode are arranged according to a predetermined coding with insertion of code gaps and that in each code gap an electrode is disposed which with respect to the supply voltage is held at the same potential as the sensor electrodes.

16. Arrangement according to claim 15 wherein at least some of the electrodes arranged in code gaps of a sensor electrode are sub-electrodes of another sensor electrode.

17. Arrangement according to claim 15 wherein at least some of the electrodes disposed in the code gaps of a sensor electrode are portions of a guard electrode.

18. Arrangement according to claim 11 wherein said first means and said second means each comprise an operational amplifier having an inverting input and a non-inverting input, the sub-electrodes of each sensor electrode being connected to the inverting input of the associated operational amplifier, and the non-inverting input of each operational amplifier lying at the potential at which the sub-electrodes are to be maintained with respect to said supply voltage.

* * * * *